United States Patent [19]

Gierer

[11] Patent Number: 5,305,862
[45] Date of Patent: Apr. 26, 1994

[54] CONTROL DEVICE FOR A FRICTIONALLY ENGAGING CLUTCH FOR A HYDRODYNAMIC TORQUE CONVERTER

[75] Inventor: Georg Gierer, Kressbronn, Fed. Rep. of Germany

[73] Assignee: Zahnradfabrik Friedrichshaften AG, Fed. Rep. of Germany

[21] Appl. No.: 690,968
[22] PCT Filed: Nov. 15, 1989
[86] PCT No.: PCT/EP89/01367
 § 371 Date: May 15, 1991
 § 102(e) Date: May 15, 1991
[87] PCT Pub. No.: WO90/06458
 PCT Pub. Date: Jun. 14, 1990

[30] Foreign Application Priority Data

Dec. 1, 1988 [DE] Fed. Rep. of Germany ....... 3840427

[51] Int. Cl.[5] ............................................. F16H 61/14
[52] U.S. Cl. ........................................ 192/3.3; 74/467; 74/732.1
[58] Field of Search ........................... 192/3.29, 3.3; 74/730.1, 732.1, 467

[56] References Cited

U.S. PATENT DOCUMENTS

| 4,768,632 | 9/1988 | Moan | 192/3.3 |
| 4,828,084 | 5/1989 | Hasegawa et al. | 192/3.3 |
| 5,090,527 | 2/1992 | Imamura et al. | 192/3.29 |

FOREIGN PATENT DOCUMENTS

| 0043545 | 1/1982 | European Pat. Off. |  |
| 3130871 | 3/1982 | Fed. Rep. of Germany |  |
| 3447651 | 7/1985 | Fed. Rep. of Germany |  |
| 2499000 | 8/1982 | France |  |
| 2-275168 | 11/1990 | Japan | 74/467 |
| 2058962 | 4/1981 | United Kingdom |  |
| WO91/00447 | 1/1991 | World Int. Prop. O. | 74/467 |

*Primary Examiner*—Richard M. Lorence
*Attorney, Agent, or Firm*—Davis, Bujold & Streck

[57] ABSTRACT

In a control mechanism for a frictionally engaged lock-up clutch of a hydrodynamic torque converter, a coupling element (8) is axially displaced for engaging and disengaging the lock-up clutch (7), face end actuation spaces (10, 11) being accordingly pressurized via regulating valves (15, 16). A lubricant line (28) leads via a radiator (39) to lubrication points (40) of a change-speed gear (6) rear-mounted on the torque converter (3), the lubricant line (28) being attached to a controlled return flow of the actuation space (11). To ensure there is a sufficient supply of lubricant to the lubrication points (40) and a sufficient cooling of the pressurized fluid or lubricant in all shift conditions of the lock-up clutch (7) via the radiator (39), a leg (34) of the main pressure line (13) is attached to the lubricant line (28) before the radiator (39) which feeds a missing amount of lubricant into the lubricant line (28).

6 Claims, 1 Drawing Sheet

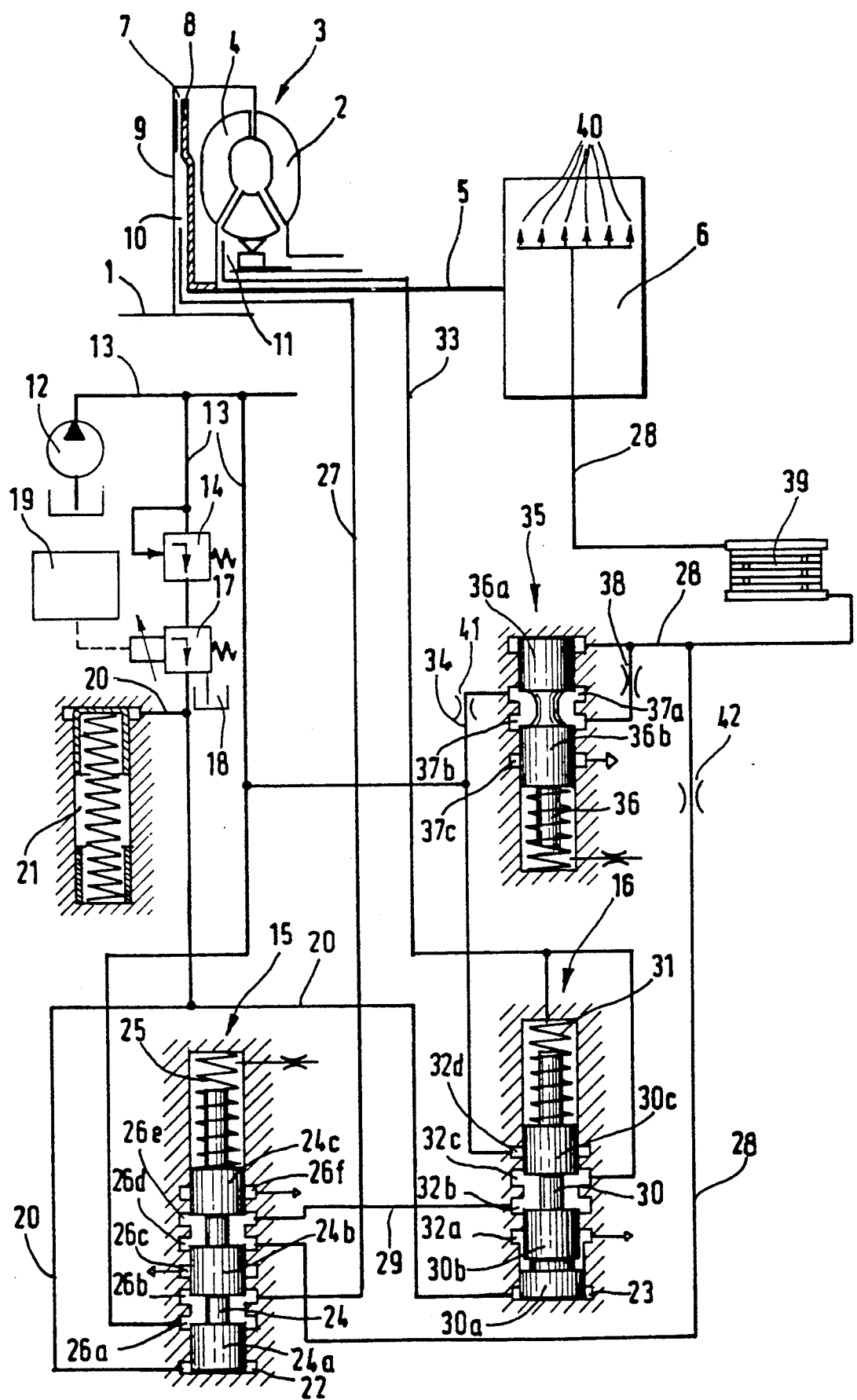

CONTROL DEVICE FOR A FRICTIONALLY ENGAGING CLUTCH FOR A HYDRODYNAMIC TORQUE CONVERTER

The invention concerns a control mechanism for a frictionally engaged lock-up clutch of a hydrodynamic torque converter whose axially displaceable coupling element is pressurizable on its end faces from actuation spaces for engaging and disengaging the lock-up clutch, said actuation spaces being attached via regulating valves to a main pressure system, and including, a lubrication system of a transmission rear-mounted on the torque converter attached to a lubricant line which is connected with a controlled return flow of the actuation space serving for engaging the lock-up clutch, and accommodating a radiator.

BACKGROUND OF THE INVENTION

A control mechanism of the above mentioned kind has been disclosed in DE-OS 31 30 871. Pressurized fluid is optionally fed from the main pressure system of the control mechanism via regulating valves to the actuation spaces of the lock-up clutch so that the lock-up clutch is in an engaged, disengaged, or slipping condition. Attached to a return flow of one of the regulating valves which is optionally connectable with one of the two actuation spaces is the lubricant line which leads via the oil cooler to the lubrication system of the transmission. In the initial phase, when the lock-up clutch is engaged, only a small amount of lubricant from the actuation space serving for disengaging reaches the lubrication points of the transmission via the radiator. A complete collapse of the lubricant pressure, which can result in damage to the transmission, occurs when the control valve of the regulating valve is in its central position so that lubricant cannot reach the lubrication points via the radiator either from the interior of the converter or from the main pressure line.

SUMMARY OF THE INVENTION

Therefore, the invention is based on the problem of preventing said difficulties and developing a control mechanism of the kind mentioned in a manner such that a sufficient amount of lubricant always reaches the lubrication points of the transmission via the radiator.

According to the invention said problem is solved by the fact that a leg of the main pressure line discharges in the lubricant line before reaching the radiator. If as a result of the positions of the regulating valves, the amount of lubricant outcropping on the radiator and on the lubrication points now diminishes, then said leg of the main pressure line feeds the missing amount into the lubricant line. Corresponding conditions can appear when the lock-up clutch is engaged or slip regulated if, in the return flow of the actuation space serving to engage the lock-up clutch, no pressurized fluid is removed.

According to the invention there must be situated in the connecting point of lubricant line and leg of the main pressure line, a pressure-regulating valve, which is pilot controlled with the pressure of the lubricant line. If the pressure increases in the lubricant line, said pressure-regulating valve, in adequate manner, reduces the feeding from the leg of the main pressure line. Therefore, the pressure in the lubricant line can to a great extent be kept constant.

According to the invention a throttle can be situated in the leg of the main pressure line and/or on the exit side of the pressure-regulating valve. These throttles, that are present separately or by pairs, must somewhat reduce the current of pressurized fluid from the main pressure line, since when the lock-up clutch is regulated or closed, there is a lesser flow of pressurized fluid required via the radiator than in pure converter operation in which the pressurized fluid becomes intensively heated.

In addition, according to the invention, in a control mechanism having an electro-magnetic pressure-control valve governed by a control unit which adjusts the pressure in a pilot control line of the regulating valves, each actuation space is coordinated with a regulating valve that adjusts the actuation pressure, both regulating valves being pressurizable by the pilot control pressure, adjusted by the control unit by means of the pressure-control valve. By said two regulating valves, which act mechanically separated from each other, the actuation spaces can be precisely and concertedly actuated with pressure or driven to a pressureless condition, and the pressurized fluid can be driven toward the return flow and consequently toward the lubricant line and the radiator.

It is also possible according to the invention to connect the actuation space in a first end position of both regulating valves, when the pilot control pressure is low or equal to zero, via the first regulating valve serving to disengage with the main pressure system and to open the other actuation space via both regulating valves. In this condition, that appears due to both regulating valves, the pressurized fluid flows from the actuation space that serves to engage the lock-up clutch into the lubricant line, the leg of the main pressure line feeding a missing amount of lubricant when the pressure drops via the pressure-regulating valve. Furthermore, according to the invention, in a second end position of both regulating valves at maximum pilot control pressure, the actuation space serving to engage can be connected with the main pressure system via the second regulating valve, and the actuation space serving to disengage can be opened toward a discharge via the first regulating valve. In said end position the pressurized fluid from the actuation space that serves to disengage the lock-up clutch is pressurelessly discharged into the tank, while lubricant reaches into the lubricant line via the pressure-regulating valve only from the main pressure line and thus into the radiator. In this shift position of the control mechanism, there also exists, a supply of lubricant of the lubrication points of the transmission with sufficient cooling of the medium used. Such conditions are met even in the intermediate positions of the control mechanism in which a slip condition is preserved in the lock-up clutch.

BRIEF DESCRIPTION OF THE DRAWINGS

For further explanation of the invention reference is had to the drawing where an embodiment is shown in simplified form.

DESCRIPTION OF THE PREFERRED EMBODIMENT

In the FIGURE, a crankshaft of an internal combustion engine is designated by 1, not shown in detail, which drives an impeller 2 of a hydrodynamic torque converter 3. The hydrodynamic torque converter 3 has in addition a turbine wheel 4 which is connected with an input shaft 5 of a change-speed gear shown diagrammatically. A lock-up clutch, situated between impeller 2 and turbine wheel 4, transmits in an engaged condition the entire drive torque from the crankshaft 1 to the input shaft 5 bypassing the torque converter 3. For this purpose, the lock-up clutch 7 has an axially displaceable coupling element 8 designed as friction disc which fictionally interacts with a section of a pump housing 9. The coupling element 8 is moved to its engaged and disengaged positions by means of a first and a second actuation space 10 and 11, respectively, situated on the end face of the axially displaceable coupling element 8.

A hydraulic pump 12 conveys pressurized fluid into a main pressure line 13 to which are attached a pressure-reducing valve 14, a first regulating valve 15 and a second regulating valve 16. In addition, said main pressure line 13 leads to a control system, not shown, of the change-speed gear 6. Rear-mounted on the pressure-reducing valve 14 is a pressure-control valve 17 which, proportionally to the current, opens and closes a drain line 18 to the tank. Said pressure-control valve 17 is actuated by a control unit 19 and governs the pressure in its exit-side pilot control line 20.

In a manner know per se, specific operation parameters of the internal combustion engine or of the transmission can be fed to the control unit, said control unit 19 supplying an adequate control current to the pressure-control valve 17 which effects a proportional adjustment of said pressure-control valve 17. The pilot control line 20 is attached to a damping element 21 and to an end face pilot control space 22 of the first regulating valve 15 and to an end face pilot control space 23 of the second regulating valve 16. The first regulating valve 15 has a control valve 24 which, in turn, is provided with control pistons 24a, b and c. A spring 25 loads the control valve 24 opposite the pilot control space 22. Inside the regulating valve 15 annuli 26a to 26f interact with the control pistons 24a to c. The main pressure line 13 is attached to the annulus 26a while a first actuation line leads from the annulus 26b to the first actuation space 10 of the lock-up clutch 7. The annuli 26c and 26f serve for pressureless draining in the tank while the annulus 26d is connected with a lubricant line 28 and the annulus 26e with a connecting line 29 leading to the second regulating valve 16.

The second regulating valve 16 has a control valve 30 with control pistons 30a to 30c, said control valve being loaded by means of a spring 31 on its end opposite the pilot control space 23. In addition, the second regulating valve 16 has in its interior annuli 32a to 32d. An annulus 32a serves for pressureless draining of the pressure medium into the tank. The second regulating valve 16 is attached to the connecting line 29 via the annulus 32b while the annulus 32c communicates via a second actuation line 33 with the second actuation space 11 of the lock-up clutch 7. The main pressure line 13 is attached to the actuation space 32d.

A leg 34 leads from the main pressure line 13 to a pressure-regulating valve 35 which is pilot controlled by the pressure predominating in the lubricant line 28. The pressure-control valve 35 has a spring-loaded control valve 36 with control pistons 36a and b and annuli 37 a to c. An annulus 37a is connected with the leg 34 of the main pressure line 13 while to the annulus 37b is connected a section of the lubricant line 28 provided with a throttle 38. The annulus 37c allows pressurelessly draining into the tank.

The lubricant line 28 accommodates a radiator 39 which can be designed as oil-water heat exchanger or oil-air heat exchanger. The lubricant line then leads to the lubrication points 40, not shown in detail, of the change-speed gear 6. A throttle 41 is situated in the leg 34 of the main pressure line 13 while the lubricant line 28 has a throttle 42 in the area before the fluid supply from the pressure-regulating valve 35.

The operation of the control mechanism shown is the following: In the illustration both regulating valves 15 and 16 are in a position in which they actuate the lock-up clutch 7 into its disengaged position, that is, the entire drive torque of the crankshaft flows through the hydrodynamic torque converter 3. For this purpose, the control unit 19, as a result of the operation parameters of the internal combustion engine and/or change-speed gear fed thereto, has adjusted the pressure-control valve 17 in a manner such that the pressure in the pilot control line 20 has assumed a minimal value so that both regulating valves 15 and 16 are in their lower position. From the main pressure line 13, via the interconnected annuli 26a and 26b, pressurized fluid reaches the first actuation line 27 and thus the first actuation space 10. A current of pressurized fluid from the second actuation space 11 flows via the second actuation line 33, via the annuli 32c and 32b open in respect to each other, the connecting line 29, the annuli 26e and 26d of the first regulating valve 15 connected in respect to each other and the lubricant line 28, as well as the radiator 39, to the lubrication points 40. The predominating pressure in the lubricant line 28 before the radiator 39 is monitored by the regulating valve 35 and if said pressure falls below a limit value, an amount of lubricant from the leg 34 is fed via the annuli 37a and 37b into the lubricant line. If the pressure in the lubricant line exceeds an upper limit value, then the pressure-regulating valve 35, removes an excessive amount of pressurized fluid via the annulus 37c. In this manner, care can be taken in that a constant amount of lubricant flows through the radiator 39 and is fed to the lubrication points 40. To convert the lock-up clutch 7 to a slip condition in which the lock-up clutch 7 transmits part of the drive torque or to a coupled condition in which the lock-up clutch 7 achieves frictional engagement of the crankshaft 1 and the input shaft 5, the pressure-control valve 17 that works proportionally to the current locks the drain line 18 in corresponding manner as a result of the current that had been fed to it from the control unit 19. Thereby the pressure rises in the pilot control line 20 and consequently in the pilot control spaces 22 and 23 of the two regulating valves 15 and 16 as well. In the other end position of both regulating valves 15 and 16, the first actuation space 10 is pressurelessly drained into the tank via its first actuation line 27 and annuli 26b and 26c by the control valve 24 of the first regulating valve 15. The control valve 30 of the regulating valve 16 assumes a position in which its control piston 30c creates a connection of the main pressure line 13 and the second actuation line 33. The coupling element 8 is thus moved to its engaged position via the pressurized second actuation space 11. In this condition, the lubricant line 28 is blocked by the first regulating valve 15 by the control piston 24b, but through the leg 34 of the main pressure line 13, depending on the position of the pressure-regulating valve 35, in the lubricant line 28, there is fed, more or less pressurized fluid which via the radiator 39 reaches the lubrication points 40 of the change-speed gear 6. Thus a perfect flow of lubricant is also ensured in this position to the lubrication points 40. Both throttle 38 and 41 reduce the flow of lubricant from the main pressure line in this position of the control mechanism, since otherwise, undesired shifting operations would be triggered on the pressure-regulating valve 35 due to the pressure level in the main pressure line. The lock-up clutch 7, obviously, is adjusted by means of the control mechanism with the end positions of both regulating valves 15 and 16 not only limited to the engaged or disengaged condition. The regulating valves 15 and 16 can also be moved by the pressure-control valve 17 into positions which lead to a slip condition of the lock-up clutch 7. In said slip condition, by means of the mechanism according to the invention, care can likewise be taken for a sufficient supply of lubricant of the lubrication points 40 of the change-speed gear 6 and a sufficient cooling of the pressure medium via the radiator 39.

| Reference numerals | |
|---|---|
| 1 | crankshaft |
| 2 | impeller of 3 |
| 3 | hydrodynamic torque converter |
| 4 | turbine wheel of 3 |
| 5 | input shaft |
| 6 | change-speed gear |
| 7 | lock-up clutch |
| 8 | coupling element |
| 9 | pump housing |
| 10 | first actuation space |
| 11 | second actuation space |
| 12 | hydraulic pump |
| 13 | main pressure line |
| 14 | pressure-reducing valve |
| 15 | first regulating valve |
| 16 | second regulating valve |
| 17 | pressure-control valve |
| 18 | drain line |
| 19 | control unit |
| 20 | pilot control line |
| 21 | damping element |
| 22 | pilot control space of 15 |
| 23 | pilot control space of 16 |
| 24 | control valve of 22 |
| 24a-c | control piston of 22 |
| 25 | spring of 22 |
| 26a-f | annuli of 22 |
| 27 | first actuation line |
| 28 | lubricant line |
| 29 | connecting line |
| 30 | control valve of 16 |
| 30a-c | control piston of 16 |
| 31 | spring of 16 |
| 32a-d | annuli of 16 |
| 33 | second actuation line |
| 34 | leg of 13 |
| 35 | pressure-regulating valve |
| 36 | control valve of 35 |
| 36a-b | control piston of 35 |
| 37a-c | annuli of 35 |
| 38 | throttle |
| 39 | radiator |
| 40 | lubrication points of 6 |
| 41 | throttle |
| 42 | throttle |

I claim:

1. A control mechanism for a frictionally engaged lock-up clutch (7) of a hydrodynamic torque converter (3) having an axially displaceable coupling element (8) being pressurizable on opposed faces thereof via first and second actuation spaces (10, 11) for engaging and disengaging said lock-up clutch (7), said first and second actuation spaces (10, 11) being connectable to a main pressure line (13) via respective first and second regulating valves (15, 16), said control mechanism including a lubricant line (28) attached to a radiator (39) and a lubrication system (40) of a transmission (6) mounted on an output side of said torque converter (3), and said lubricant line (28) being connected with a controlled return (26d) of pressurized fluid from said second actuation space, wherein a supply leg (34) of said main pressure line (13) discharges into said lubricant line (28) before said radiator (39); and a pressure-regulating valve (35) is situated between the supply leg (34) of said main pressure line (13) and said main pressure line's connection point with said lubricant line (28), and a valve position of said pressure-regulating valve (35) is controlled by pressure fluid in said lubricant line (28).

2. A control mechanism according to claim 1, wherein a throttle (38, 41) is situated in at least one of said supply leg (34) of said main pressure line (13) and on an exit side of said pressure-regulating valve (35).

3. A control mechanism according to claim 1, wherein a throttle (38, 41) is situated in both said supply leg (34) of said main pressure line (13) and on an exit side of said pressure-regulating valve (35).

4. A control mechanism according to claim 1, wherein the first and second regulating valves (15, 16) are respectively adjustable to supply pressurize fluid to said first and second actuation spaces (15, 16) and both said first and second regulating valves (15, 16) are controlled via a pilot control pressure adjustable by an electric pressure-control valve (17).

5. A control mechanism according to claim 4, wherein, when the pilot control pressure is low or equal to zero, said first and second regulating valves (15, 16) are in a first end position and said first actuation space (10) is connected with said main pressure line (13), via said first regulating valve (15), to disengage said lock-up clutch and said second actuation space (11) returns pressurized fluid, supplied to said torque converter (3), to a sump via both said first and second regulating valves (15, 16).

6. A control mechanism according to claim 4, wherein, at a maximum pilot control pressure, said first and second regulating valves (15, 16) are in a second opposite end position, and said second actuation space (11) is connected, via said second regulating valve (16), with said main pressure line (13) to engage said lock-up clutch and pressurized fluid is discharged from said first actuation space (10) to a sump via said first regulating valve (15).

* * * * *